(12) United States Patent
Force et al.

(10) Patent No.: US 8,835,576 B2
(45) Date of Patent: Sep. 16, 2014

(54) ETHYLENE EXPANSION FOR LOW TEMPERATURE REFRIGERATION IN POLYETHYLENE VENT RECOVERY

(75) Inventors: Randall L. Force, Charleston, WV (US); Donald A. Fischer, Cross Lanes, WV (US)

(73) Assignee: Univation Technologies, LLC

( * ) Notice: Subject to any disclaimer, the term of this patent is extended or adjusted under 35 U.S.C. 154(b) by 0 days.

(21) Appl. No.: 13/808,632

(22) PCT Filed: Jul. 7, 2011

(86) PCT No.: PCT/US2011/043123
§ 371 (c)(1),
(2), (4) Date: Feb. 8, 2013

(87) PCT Pub. No.: WO2012/006387
PCT Pub. Date: Jan. 12, 2012

(65) Prior Publication Data
US 2013/0125581 A1    May 23, 2013

Related U.S. Application Data

(60) Provisional application No. 61/362,989, filed on Jul. 9, 2010.

(51) Int. Cl.
| | | |
|---|---|---|
| *C08F 2/00* | (2006.01) | |
| *C08F 110/02* | (2006.01) | |
| *B01J 8/18* | (2006.01) | |
| *F25J 3/00* | (2006.01) | |
| *C08F 6/00* | (2006.01) | |
| *F25J 3/06* | (2006.01) | |
| *F25J 3/08* | (2006.01) | |

(52) U.S. Cl.
CPC . *F25J 3/08* (2013.01); *C08F 6/005* (2013.01); *F25J 2210/12* (2013.01); *F25J 3/064* (2013.01); *C08F 6/001* (2013.01); *F25J 2215/58* (2013.01); *F25J 2260/10* (2013.01); *F25J 3/062* (2013.01); *F25J 3/0685* (2013.01); *F25J 2270/14* (2013.01); *F25J 3/066* (2013.01)
USPC .............. 526/70; 526/68; 526/352; 422/139; 62/618

(58) Field of Classification Search
CPC ............. C08F 6/001; C08F 6/005; F25J 3/08; F25J 3/62; F25J 3/064; F25J 3/066; F25J 3/0685; F25J 2210/12; F25J 2215/58; F25J 2260/10; F25J 2270/14; C08L 23/00
USPC .................. 526/70, 68, 352; 422/139; 62/618
See application file for complete search history.

(56) References Cited

U.S. PATENT DOCUMENTS

| | | |
|---|---|---|
| 3,450,183 A | 6/1969 | Hinton |
| 3,594,356 A | 7/1971 | Hinton |
| 4,197,399 A | 4/1980 | Noel et al. |
| 4,372,758 A | 2/1983 | Bobst et al. |
| 5,391,656 A * | 2/1995 | Campbell et al. ............... 526/68 |

* cited by examiner

*Primary Examiner* — William Cheung
(74) *Attorney, Agent, or Firm* — Jennifer A. Schmidt; Kristina Leavitt (57) ABSTRACT

Provided are processes and systems for recovering hydrocarbons in a vent stream from a polymerization process. The methods and systems may include the recovery of an olefin monomer from a polymerization vent gas using ethylene refrigeration to condense and recover the olefin monomers from the vent gas. In some embodiments, the methods and systems may also include compression and condensation of polymerization vent gas, recompression of ethylene refrigerant, and use of an expander compressor turbine device for ethylene refrigeration.

12 Claims, 5 Drawing Sheets

ETHYLENE EXPANSION FOR LOW TEMPERATURE REFRIGERATION IN POLYETHYLENE VENT RECOVERY

CROSS-REFERENCE TO RELATED APPLICATIONS

This application is a National Stage application under 35 U.S.C. §371 of International Application No. PCT/US2011/43123, filed Jul. 7, 2011, that claims the benefit of Ser. No. 61/362,989, filed Jul. 9, 2010, the disclosures of which are incorporated by reference in their entireties.

FIELD OF THE INVENTION

Disclosed herein is a polyolefin vent gas recovery using an ethylene refrigeration system. Also described herein is to a method and a system for using ethylene expansion for low-temperature refrigeration in polyethylene process vent recovery.

BACKGROUND

Olefins, such as ethylene, may be polymerized by contacting them under polymerization conditions with a catalyst to produce a granular polymer. The granular polymers produced usually contain residual gaseous or liquid alkenes and alkanes as well as other hydrocarbons. These hydrocarbons should be removed from the granular resin for many reasons including, for example, quality control of the final end product and safety reasons. In addition, proper disposal of the hydrocarbon is required in order to meet environmental standards concerning hydrocarbon emissions.

There are various techniques for removing volatile hydrocarbons from polymers. For example, U.S. Pat. Nos. 4,197,399, 3,594,356, and 3,450,183 disclose a columnar (or straight cylindrical) vessel used as a purger, referred to as a polymer purge bin, or product purge bin. U.S. Pat. No. 4,372,758 discloses a degassing or purging process for removing hydrocarbons, such as alkenes, from solid olefin polymers. The purging process generally comprises conveying the solid polymer (e.g., in granular form) to a polymer purge bin and contacting the polymer in the purge bin with a countercurrent inert purge gas stream to strip away any hydrocarbon vapors that are released from the polymer. Nitrogen is most commonly used as the inert purge gas. However, it is also possible to use a light hydrocarbon rich gas to strip the heavier hydrocarbons in a first stage and then use an inert gas in a second stage for the comparatively easy task of stripping the light hydrocarbons that remain in and around the resin after the first stage.

A vent recovery system is typically utilized to recover hydrocarbons, such as an olefin monomer, from the mixed hydrocarbon and inert purge gas stream exiting the purge vessel. Existing methods of recovering hydrocarbons in the polymerization process vent gas include: (a) compression and condensation with at least one of water or air, mechanical refrigeration, and ethylene expansion, to cool to approximately −10° C.; and (b) separation via pressure swing absorption (PSA) or membranes. In existing gas phase polyethylene plants, option (a) is most commonly used, however, a combination of option (a) and option (b) may also be used.

In a compression and condensation system, such as described in U.S. Pat. No. 5,391,656, a polymer purge bin vent stream containing an inert gas, such as nitrogen, and an olefin monomer is treated in a series of steps that include: (a) cooling to condense a portion of the polymerization vent gas; (b) separating the condensed liquids from the remaining non-condensable light gas; (c) compressing the non-condensable light gas; (d) cooling the compressed stream to promote further condensing; (e) further separating the condensed liquids from the remaining non-condensable light gas; and (f) recycling the condensed liquids containing the olefin monomer.

Conventional compression and cooling vent recovery systems using ambient air or water cooling may recover most of the heavier hydrocarbons, such as butene, isopentane, hexene, hexane, and other heavy alkanes and olefins, contained in vent gas. However, the amount of hydrocarbon recovery is constrained by the practical limit on the ambient cooling medium supply temperature. Consequently, a conventional vent gas recovery system will typically recover only up to 50% of the vented ethylene monomer, causing loss of valuable hydrocarbon and increased flaring.

Furthermore, the inert gas, such as nitrogen, remaining in the polymerization vent gas after the condensed liquid separation, may still contain significant amounts of heavier hydrocarbons, precluding its re-use as a resin drying or purge gas. To reach a higher ethylene recovery and achieve a higher quality of recovered gas, further processing may be required.

Refrigeration systems, including mechanical refrigeration and olefin expansion, may also be used for cooling in polymerization vent gas separation. Refrigeration has certain advantages over conventional ambient cooling. For example, refrigeration systems may achieve a final condensation temperature of below 0° C., and thus may be more efficient in hydrocarbon removal from polymerization vent gas.

Mechanical refrigeration uses a compression refrigeration system to provide a coolant, such as chilled brine or glycol mix, to the vent recovery area. Mechanical refrigeration units (MRU) typically achieve a final polymerization vent gas condensation temperature as low as −10 to −20° C., thus facilitating additional liquid hydrocarbon recovery via condensation. However, MRU's require high equipment costs and unit operating costs associated with increased power usage and refrigerant handling. In addition, MRUs may require the introduction of new and potentially toxic chemicals to the site, such as halo-fluorocarbons, for compression refrigeration of brine or glycol, which may not be desirable.

Olefin expansion may also be used for vent gas recovery, wherein condensation of hydrocarbons in a polymerization vent gas containing non-condensable inerts, such as nitrogen, is accomplished via partial expansion of a high-pressure olefin. U.S. Pat. No. 5,391,656 discloses such a process of "free refrigeration," where the ethylene is partially expanded from a high pressure, such as about 800-1000 psig, to a lower pressure required to supply the ethylene purification system upstream of the polymerization unit, such as a pressure of about 350-400 psig. Similar to the typical MRU operation, the partial expansion of ethylene may generally achieve a final condensation temperature of −10 to −20° C., sufficient to condense a high percentage of the ethylene monomer contained in the process vent gas. However, a significant amount of ethylene may still remain in the non-condensed vent gas.

Therefore, there still exists a need for an improved method and apparatus to separate hydrocarbons from polymerization vent gas that would: (a) recover and reuse more of the valuable olefin monomer; (b) reduce flaring of unrecovered hydrocarbons; and (c) allow re-use of vent gas containing inerts, such as nitrogen, as a purge medium for the polymer purge bin.

SUMMARY

Disclosed herein is a process for the recovery of hydrocarbons from a polymerization vent gas. The process comprises:

(a) reducing the pressure of an ethylene stream from a pressure greater than or equal to 3.4 MPa to a pressure of less than or equal to about 1.4 MPa to from a reduced pressure ethylene stream; (b) cooling a vent gas comprising a monomer via heat exchange with the reduced pressure ethylene stream to form a first condensate comprising at least a portion of the monomer entrained in a first light gas; (c) recovering the first condensate and the first light gas; (d) separating the first condensate from the first light gas; (e) compressing the reduced pressure ethylene stream to a pressure greater than or equal to 2.4 MPa; and (f) passing the compressed ethylene stream to a polymerization reactor.

Also disclosed herein is a system for the recovery of hydrocarbons from a polymerization vent gas. The system may comprise an ethylene expander and a first vent gas recovery system in fluid communication with the ethylene expander. The first vent gas recovery system may comprise (i) a heat exchanger in fluid communication with a vent gas line and the ethylene expander and configured to provide heat exchange between an incoming vent gas and ethylene from the ethylene expander, whereby incoming ethylene from the ethylene expander is condensed into a first condensate comprising ethylene monomers in a first light gas; (ii) a separator in fluid communication with the heat exchanger having an inlet configured to receive the first condensate and configured to separate the first condensate from the first light gas; and (iii) a compressor in fluid communication with the separator having an inlet configured to receive the first light gas from the separator.

DETAILED DESCRIPTION

Before the present compounds, components, compositions, devices, systems, hardwares, configurations, and/or methods are disclosed and described, it is to be understood that unless otherwise indicated, the embodiments disclosed herein are not limited to specific compounds, components, compositions, devices, systems, hardwares, configurations, and/or methods or the like, as such may vary, unless otherwise specified.

It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Disclosed herein are methods and systems for recovering hydrocarbons in a vent stream from a polymerization process. More specifically, disclosed herein are methods and systems for recovery of an olefin monomer from a polymerization vent gas using ethylene refrigeration to condense and recover the olefin monomers from the vent gas. In some embodiments, the methods and systems may also include compression and condensation of polymerization vent gas, recompression of ethylene refrigerant, and use of an expander compressor turbine device for ethylene refrigeration.

Olefin expansion may be used to generate a heat transfer medium for cooling a polymerization vent gas. For example, a high pressure olefin, such as ethylene monomer, may be expanded to produce a low temperature refrigerant that may be used to cool a polymerization vent gas. In some embodiments, expansion of a high-pressure ethylene pipeline gas typically available in a polyethylene plant may be used for recovery of ethylene monomer from the polymerization vent gas. For example, the high pressure polyethylene may be supplied from an internal source within the plant. One skilled in the art would recognize that the high pressure ethylene may also come from other sources.

Pipeline ethylene is typically supplied at a pressure higher than that required to feed an ethylene purification system upstream of polymerization processes. The high pressure pipeline ethylene may be supplied at a pressure greater than 3.4 MPa, or greater than 6.8 MPa.

The high pressure ethylene may be expanded to produce a reduced pressure ethylene having a reduced temperature that may be used as a refrigerant in a polymerization vent gas recovery process. In some embodiments, the high pressure ethylene may be cooled to a temperature of less than about 10° C. prior to expansion. The ethylene pressure may be reduced via expansion from a pressure of greater than or equal to 3.4 MPa to a pressure less than or equal to 1.4 MPa, or to a pressure less than or equal to 0.9 MPa, or less than or equal to 0.2 MPa. The reduction of pressure via expansion may produce an ethylene refrigerant with a temperature of less than or equal to −30° C., or less than or equal to −50° C., or less than or equal to −90° C. Use of ethylene refrigeration at temperatures of less than or equal to about −30° C. may achieve a high level of hydrocarbon recovery via condensation from the polymerization vent gas.

For example, reducing ethylene pressure via expansion from approximately 3.4 MPa to a pressure of 1.4 MPa or less may produce ethylene refrigerant at a temperature of approximately −30° C. or less. In another example, reducing ethylene pressure via expansion from approximately 3.5 MPa to a pressure of 0.9 MPa or less may produce ethylene refrigerant at a temperature of approximately −50° C. or less. In another example, reducing ethylene pressure via expansion from approximately 3.5 MPa to a pressure of 0.2 MPa or less may produce ethylene refrigerant at a temperature of approximately −90° C. or less.

In some embodiments, the minimum ethylene pressure required to supply the ethylene purification system is approximately 3.1 MPa. Thus, the reduced pressure ethylene, after furnishing the necessary refrigeration duty, may subsequently be compressed in order to forward the ethylene through an ethylene purification system. In one particular embodiment, the reduced pressure ethylene may be compressed to a pressure greater than or equal to 2.4 MPa, or greater than or equal to 3.1 MPa to supply the ethylene purification system upon cooling the polymerization vent gas. In other embodiments, the ethylene may be compressed to pressures as may be require to feed a polymerization purification system or a polymerization process, including gas-phase polymerization processes, loop reactor systems, and slurry reactor systems.

Figure 1:
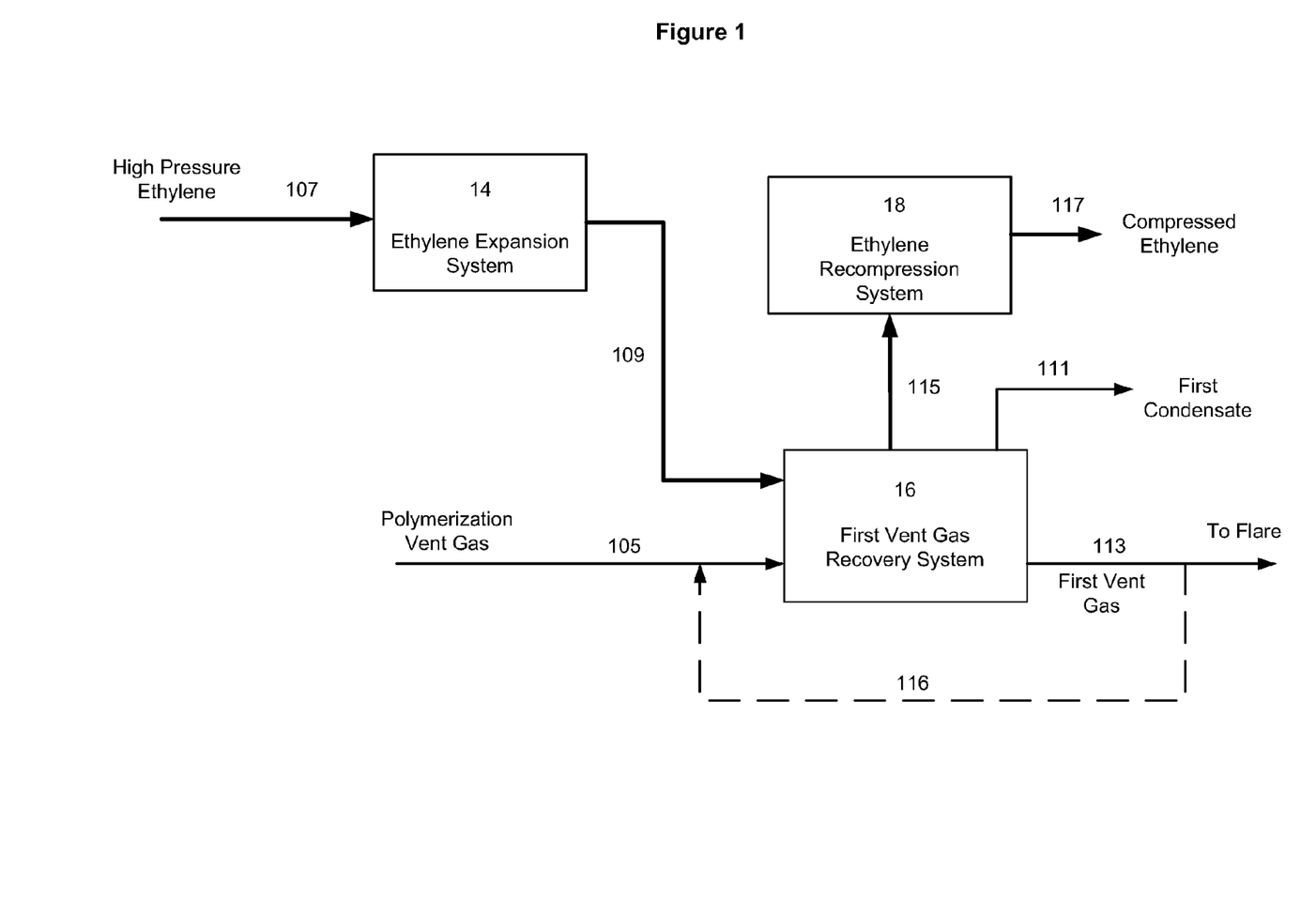
FIG. 1 illustrates a process for recovering hydrocarbons from a polymerization vent gas using ethylene expansion.

Referring now to FIG. 1, a process for recovering hydrocarbons from a polymerization vent gas via condensation is illustrated. A high pressure ethylene stream (107) may be expanded from a high pressure, such as a at a pipeline supply pressure, to a lower pressure in ethylene expansion system (14). The low pressure ethylene, having a reduced temperature, may be recovered via flow line (109).

A polymerization vent gas (105), which may include inert gases and condensable hydrocarbons, may be cooled and at least partially condensed via indirect heat exchange with the low pressure ethylene in a first vent gas recovery system (16). The polymerization vent gas, including entrained condensate, may then be separated into a first condensate, recovered via flow line (111), and a first vent gas, recovered via flow line (113).

The ethylene, following indirect heat exchange, may be recovered via flow line (115). The pressure of the ethylene may then be increased, such as to a pressure sufficient to feed the ethylene to an ethylene purification system or to a polymerization reactor, in ethylene compression system (18), recovering the compressed ethylene in stream (117).

The polymerization vent gas (105) may be a vent that originates from a polymerization reactor (not shown) and is separated from a polymerization product (not shown). The polymerization process may be a gas-phase fluidized bed process, a liquid-phase process, a heterogeneous catalyst slurry process, or any other process for the polymerization of monomers into polymers. The polymerization reaction vent may originate from a purging device, for example, a polymer purge bin, where residual hydrocarbon is removed from the polymers by passing a purge medium through a vessel containing the polymer product. The purge medium may be an inert gas, such as nitrogen or argon, or any gas low in the hydrocarbons that are targeted for removal from the polymer product, for example, an olefin monomer. In liquid polymerization systems, the vent gas may also originate from one or more flash tanks downstream of the polymerization process.

Polymerization reaction effluent frequently contains unreacted ethylene monomer entrained with the polymerization product. The polymerization vent gas (105) may include monomers and co-monomers, such as $C_2$ to $C_{12}$ olefins and dienes; reactor diluents, such as $C_1$ to $C_{10}$ hydrocarbons; and an inert, such as nitrogen or argon. In some embodiments, the polymerization vent gas (105) includes ethylene monomer. The polymerization vent gas (105) may also include $C_4$ to $C_{12}$ co-monomers. The polymerization vent gas (105) may also include an induced condensing agent (ICA), for example, a cycloalkane. ICA's, such as isobutane, isopentane, n-hexane, and halogenated hydrocarbons, may be used to raise the molecular weight or specific heat of the vent gas in order to promote condensation of the lighter components, such as ethylene monomer.

The ethylene monomer, co-monomers, and reactor diluents may be removed from the polymerization product in the polymer purge bin using a purge medium to produce the polymerization vent gas (105). In some embodiments, the polymerization vent gas (105) may include an inert gas, for example, nitrogen or argon, which may be introduced as the purge medium or as an assist gas to the polymerization reactor. In other embodiments, the polymerization vent gas (105) may include low molecular weight hydrocarbons, such as ethylene, to assist in the removal of hydrocarbons from the polymerization product.

The reduced pressure ethylene (109), having a reduced temperature, may include ethylene monomer that originates from a high-pressure ethylene source, such as an ethylene pipeline. In some embodiments, the ethylene may contain high purity ethylene. In other embodiments, the ethylene in flow line (109) may contain over 80% ethylene.

The high pressure ethylene (107) may be expanded in an ethylene expansion system (14) to reduce the temperature of the ethylene, recovered via flow line (109). In some embodiments, the expanded ethylene in flow line (109) may be at a temperature of less than or equal to about −30° C., or less than or equal to about −50° C., or less than or equal to about −90° C.

The first condensate (111) may be a liquid containing hydrocarbons, for example, ethylene monomer and co-monomers, having a higher boiling point than a first vent gas (113). The first condensate (111) may be an olefin or a mixture of olefins and paraffins. Nitrogen gas may also be entrained with the first condensate (111) during the processing steps including condensation and separation. In some embodiments, the first condensate (111) may comprise less than 2% nitrogen, or less than 1% nitrogen.

In some embodiments, the first condensate (111) may be formed from the polymerization vent gas (105) in a first vent gas recovery system (16) by condensing at least a portion of the hydrocarbons in the vent gas. For example, the first condensate (111) may be formed by cooling to condense at least a portion of the vent gas via indirect heat exchange with the expanded ethylene in flow line (109). The first condensate (111) may be further separated from the first vent gas (113), for example, using a separator vessel.

The first vent gas (113) may include an inert compound, for example, nitrogen or argon, and may have a reduced hydrocarbon content compared to the polymerization vent gas (105). In some embodiments, the first vent gas (113) is a light gas and may include light hydrocarbons, for example, ethylene monomer. In other embodiments, the first vent gas (113) may also contain $C_3$ and heavier hydrocarbons, for example, co-monomers and ICA. The amount of ethylene and/or other light hydrocarbons remaining with the first vent gas (113) may depend upon a number of factors, including the temperature of the first vent gas (113) following the indirect heat exchange with the expanded ethylene (109).

In some embodiments, the first vent gas (113), containing some residual hydrocarbon, may be disposed of by venting to flare or may be recycled to the first vent gas recovery system (16) for further treatment via flow line (116). In other embodiments, the first vent gas (113), having a reduced amount of heavier hydrocarbons, may be used as the purge medium for the polymer purge bin.

Following the indirect heat exchange of the expanded ethylene in flow line (109) and the vent gas, the expanded ethylene may be recovered via flow line (115). In some embodiments, the expanded ethylene in flow line (115) may be compressed in an ethylene recompression system (18).

The compressed ethylene (117) may be produced in one or more compression steps in the ethylene recompression system (18). For example, a reciprocating compressor or a screw compressor may be used to compress ethylene. One skilled in the art would recognize that other types of compressors could also be used to compress ethylene. The ethylene in flow line (117) may be compressed to a pressure of greater than or equal to about 2.4 MPa, greater than or equal to 3.1 MPa. The compressed ethylene (117) may be cooled to a temperature of less than or equal to about 10° C. In some embodiments, the compressed ethylene (117) may be further sent to ethylene purification upstream of the polymerization reactor. In other embodiments, the compressed ethylene (117) may be combined with a high pressure ethylene source to feed ethylene purification. In yet other embodiments, the compressed ethylene (117) may be sent directly to the polymerization reactor.

Ethylene Refrigeration

Figure 2:
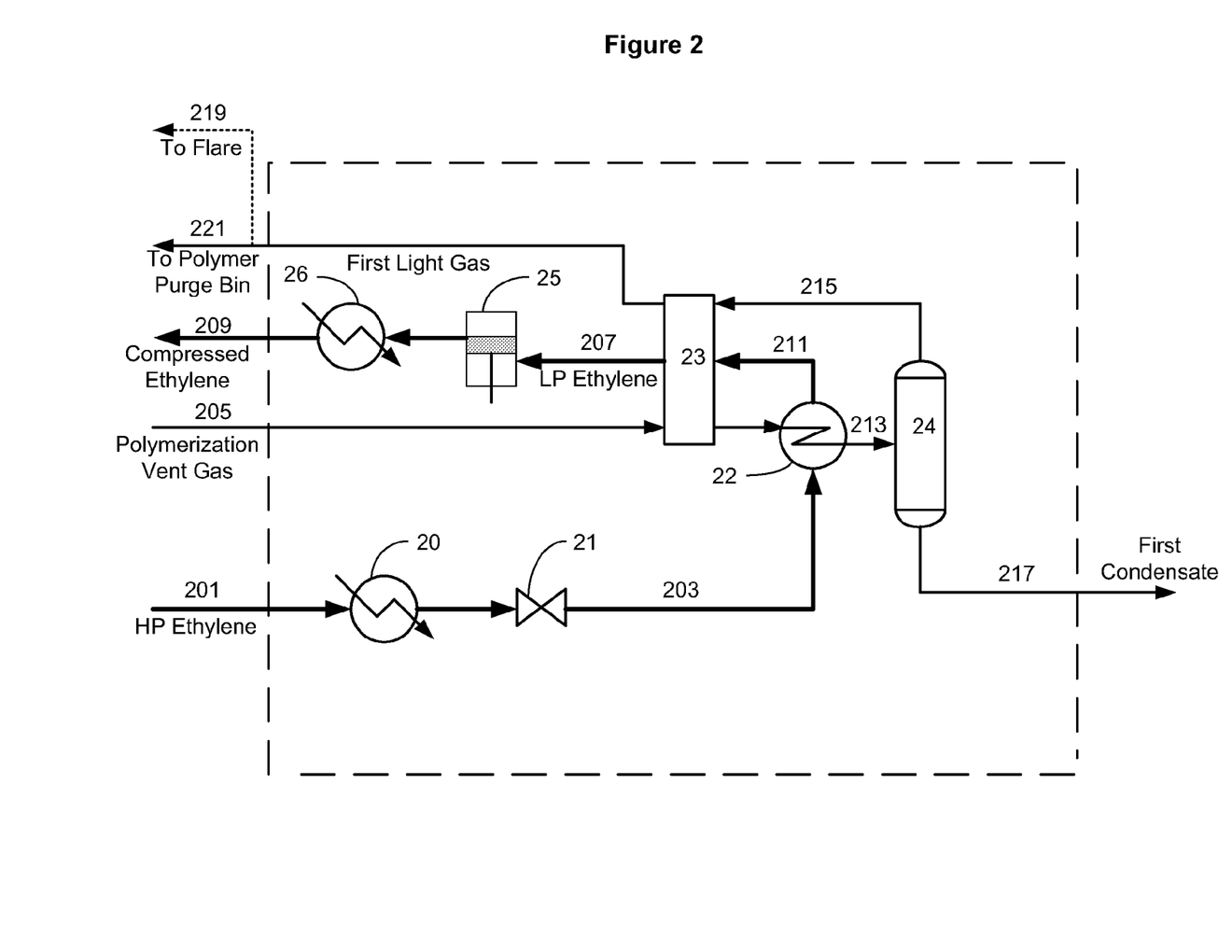
FIG. 2 illustrates a process for recovering hydrocarbons from a polymerization vent gas using ethylene expansion accomplished via a choking valve system.
Figure 3:
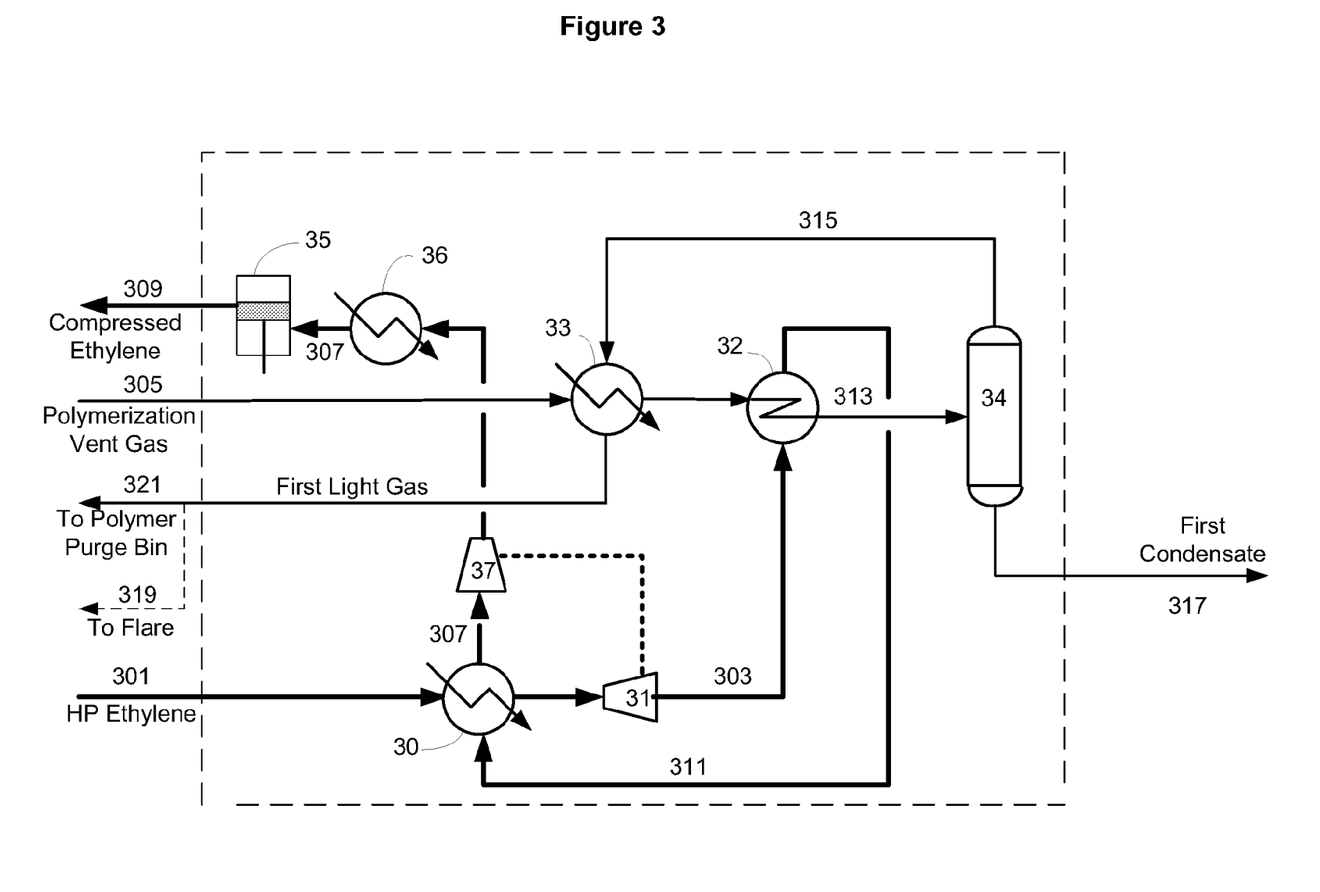
FIG. 3 illustrates a process for recovering hydrocarbons from a polymerization vent gas using ethylene expansion accomplished via an expander compressor turbine system.

Referring to FIGS. 2 and 3, embodiments of ethylene expansion, vent gas recovery via indirect heat exchange, and ethylene compression are illustrated.

High pressure ethylene (201, 301) may be cooled by expansion, and expanded ethylene may be recovered via flow line (203, 303). The expanded ethylene in flow line (203, 303) may be used to cool a polymerization vent gas (205, 305) via indirect heat transfer in one or more steps and may be recovered via flow line (207, 307). The reduced pressure ethylene in flow line (207, 307) having an increased temperature may be compressed to produce compressed ethylene (209, 309). In some embodiments, the compressed ethylene (209, 309) may be sent to ethylene purification. In other embodiments, the compressed ethylene (209, 309) may be sent directly to a polymerization reactor.

The expansion of ethylene, the indirect heat exchange, and the compression of ethylene each may be accomplished using various flow schemes, two embodiments of which are illustrated in FIGS. 2 and 3. Referring now to FIG. 2, high pressure ethylene (201) from a high pressure source is partially expanded to a lower pressure via a high-pressure choke valve (21). Prior to expansion, the high pressure ethylene (201) may be cooled via indirect heat exchange in a high-pressure ethylene pre-cooler (20). For example, prior to expansion, the ethylene stream may be cooled to a temperature less than or equal to about 10° C. The low pressure ethylene, having a reduced temperature, may be recovered via flow line (203).

A polymerization vent gas (205), which may include inert gases and condensable hydrocarbons, may be cooled and at least partially condensed via indirect heat exchange with the low pressure ethylene (203) in one or more steps to produce a first condensate (217) and a first light gas (215). More specifically, the polymerization vent gas (205) may be cooled via indirect heat exchange with the low pressure ethylene (203) in a first vent gas cooler (22), recovering the low pressure ethylene via flow line (211).

Upon cooling and partial condensing of the polymerization vent gas (205) in the first vent gas cooler (22), a mixed phase stream (213) may be separated in a first separator vessel (24), recovering the resulting first light gas (215) and the first condensate (217). The first light gas (215), alone or in combination with the low pressure ethylene (211), may be used to further cool the polymerization vent gas. For example, the polymerization vent gas (205) may be cooled in a second vent gas cooler (23) via indirect heat exchange with both the first light gas (215) and the low pressure ethylene (211). Similar to the first vent gas cooler (22), the second vent gas cooler (23) may include, but not be limited to, a shell and tube heat exchanger, a spiral wound heat exchanger, or a brazed aluminum heat exchanger. One skilled in the art would recognize that other types of heat exchangers may also be used.

The ethylene, following indirect heat exchange, may be recovered via flow line (207). The pressure of the ethylene may then be increased, such as to a pressure sufficient to feed the ethylene to an ethylene purification system or to a polymerization reactor, using an ethylene compressor (25), recovering the compressed ethylene via flow line (209). After compression, the ethylene may be cooled in a compressor after-cooler (26).

Referring now to FIG. 3, high pressure ethylene (301) from a high pressure source is partially expanded to a lower pressure via an ethylene expander (31) that may be used to recover useful energy. The expanded ethylene, having a reduced temperature, may be recovered via flow line (303). Prior to expansion, the high pressure ethylene (301) may be cooled via indirect heat exchange in a high-pressure ethylene pre-cooler (30).

The expansion energy recovered in the ethylene expander (31) may be used as motive force for various processes or may be used to generate electricity. For example, at least a portion of the energy generated from reducing the pressure of the ethylene may later be used to compress the reduced pressure ethylene in an expansion engine or expansion turbine. In one embodiment, the ethylene expander (31) may be connected to an ethylene pre-compressor (37) via a driving shaft in order to provide at least a portion of the energy required for recompression of the expanded ethylene.

A polymerization vent gas (305), which may include inert gases and condensable hydrocarbons, may be cooled and at least partially condensed via indirect heat exchange with the expanded ethylene (303) in one or more steps to produce a first condensate (317) and a first light gas (315). More specifically, the polymerization vent gas (305) may be cooled via indirect heat exchange with the expanded ethylene (303) in a first vent gas cooler (32), recovering the low pressure ethylene via flow line (313).

Upon cooling and partial condensing of the polymerization vent gas (305) in the first vent gas cooler (32), a mixed phase stream (313) may be separated in a first separator vessel (34), recovering the resulting first light gas (315) and the first condensate (317). The first light gas may be used to further cool the polymerization vent gas, for example, in a second vent gas cooler (33) via indirect heat exchange. Similar to the first vent gas cooler (32), the second vent gas cooler (33) may include, but not be limited to, a shell and tube heat exchanger, a spiral wound heat exchanger, or a brazed aluminum heat exchanger. One skilled in the art would recognize that other types of heat exchangers may also be used.

The ethylene, following indirect heat exchange, may be recovered via flow line (311) and recompressed in one or more compression steps. For example, the ethylene in flow line (311) may be initially compressed in an ethylene pre-compressor (37) and then further compressed in an ethylene compressor (35) to produce compressed ethylene (309). In some embodiments, the ethylene compressor (35) or the ethylene pre-compressor (37) alone may be used to compress the ethylene. The compression of the ethylene in one or more steps may be to a certain pressure, such as to a pressure sufficient to feed the ethylene to an ethylene purification system or to a polymerization reactor.

Prior to compression, additional cooling duty may be recovered from the expanded ethylene in flow line (311) by using it to cool the high pressure ethylene (301) in a high-pressure ethylene pre-cooler (30) prior to expansion.

After compression, the ethylene may be cooled in order to remove at least a portion of the heat of compression generated in one or more ethylene compression steps. For example, a compressor after-cooler (36) may cool the compressed ethylene downstream of the ethylene pre-compressor (37). In another embodiment, not shown, the compressor after-cooler (36) may be located downstream of the ethylene compressor (35) in order to remove the heat of ethylene compression. In yet other embodiments, two or more compression after-coolers may be used in series after the compression step(s).

Referring now to both FIGS. 2 and 3, the high pressure ethylene (201, 301) may be cooled in the high-pressure ethylene pre-cooler (20, 30) using a non-refrigerated heat transfer medium, such as water or air, or using mechanical refrigeration. In some embodiments, the high pressure ethylene (301) may be cooled using the expanded ethylene (311), having an intermediate temperature after indirect heat exchange with a vent gas.

The first vent gas cooler (22, 32) or the second vent gas cooler (23, 33) may be individually selected from a shell and tube heat exchanger, a brazed aluminum heat exchanger, and a spiral wound heat exchanger. One skilled in the art would recognize that other types of heat exchangers may also be used for cooling the vent gas.

In some embodiments, the polymerization vent gas (205, 305) may be cooled and partially condensed in at least one of the first vent gas cooler (22, 32) and the second vent gas cooler (23, 33) to produce a two phase mixture (213, 313). A vapor phase of the two phase mixture (213, 313) may include the non-condensable components and inerts, such as nitrogen and argon, while a liquid phase of the two phase mixture (213, 313) may include liquid hydrocarbons. The two phase mixture (213, 313) may be separated into the first light gas (215, 315) and the first condensate (217, 317) in the first separator vessel (24, 34).

As described for FIG. 1 embodiments above, the first light gas (215, 315) may have a reduced hydrocarbon content compared to the polymerization vent gas (205, 206). The first light gas (215) may also be used to cool a polymerization vent gas via indirect heat exchange in a vent gas cooler. In some embodiments, the first light gas (215 and 315) may contain residual hydrocarbon, for example, ethylene monomer. The first light gas (215 and 315) containing a significant amount of residual hydrocarbon may be disposed of by venting to flare via flow line (219, 319) or by recycling to vent gas recovery for further treatment. In other embodiments, the first light gas (215, 315) may contain essentially no residual C4 or heavier hydrocarbon. The first light gas (215, 315), when having a sufficiently reduced heavy hydrocarbon content, may be recycled as a purge medium (221, 321) to a polymer purge bin.

Overview of Second Vent Gas Recovery Using Compression

The vent gas may be recovered by compressing a polymerization vent gas to condense at least a portion of the hydrocarbons. As a result of compression, the increased pressure of the polymerization vent gas raises the dew point of a hydrocarbon component, for example, ethylene monomer, in the vent gas. Thus, a hydrocarbon component in a compressed polymerization vent gas may condense at a higher temperature, thereby reducing the cooling requirements. In some embodiments, a combination of compression and cooling may also increase the overall recovery of certain low boiling point hydrocarbons in polymerization vent gas, for example, ethylene monomer, as compared to cooling with no compression.

Polymerization vent gas recovery using compression and non-refrigerated cooling may be conducted in series with ethylene refrigeration in order to achieve additional vent gas recovery. For example, a polymerization vent gas may first undergo compression and initial condensation at higher temperatures followed by refrigerated ethylene cooling in order to incrementally condense additional hydrocarbon at lower temperatures.

Figure 4:
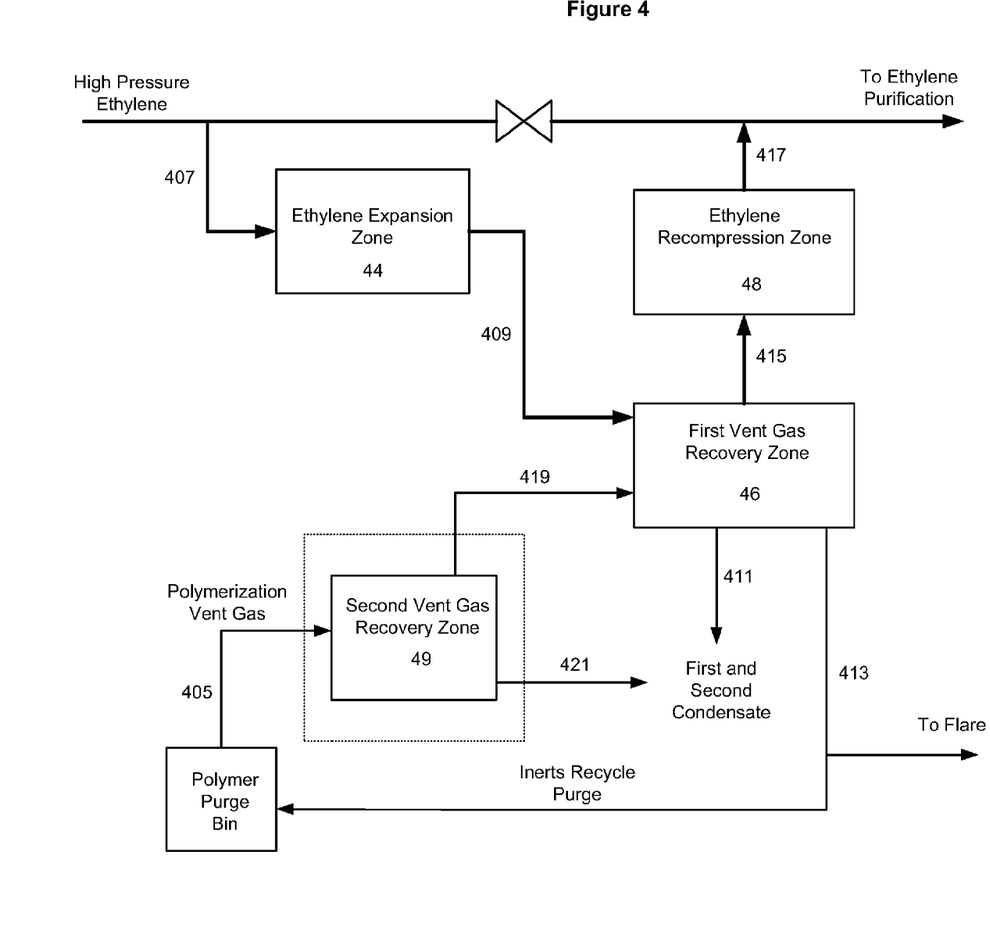
FIG. 4 illustrates a process for recovering hydrocarbons from a polymerization vent gas using ethylene expansion in combination with polymerization vent gas compression and cooling.

Referring now to FIG. 4, a method for recovering hydrocarbons from a polymerization vent gas, including compressing and cooling of the polymerization vent gas in order to achieve increased hydrocarbon recovery is illustrated.

The polymerization vent gas (405) may be compressed and cooled using a non-refrigerated heat transfer medium in a second vent gas recovery system (49) to condense at least a portion of the hydrocarbons contained in the vent gas. Following the compression and cooling, a second light gas (419) and a second condensate (421) may be separated and recovered. The second light gas (419) may be sent to a first vent gas recovery system (46), similar to that described above for FIG. 1, for further hydrocarbon separation and recovery. The second condensate (421) may be combined with a first condensate (411) and sent to an ethylene polymerization reactor.

The second light gas (419) may be cooled via indirect heat exchange in the first vent gas recovery system (46) with expanded ethylene (409). The expanded ethylene (409) may come from a high pressure ethylene (407) that has been reduced to a lower pressure via expansion in an ethylene expansion system (44). After cooling in the first vent gas recovery system (46), the second light gas (419) may be separated into a first condensate (411) and a first light gas (413). Following the indirect heat exchange with the polymerization vent gas, the expanded ethylene may be recovered via flow line (415). The expanded ethylene in flow line (415) may be compressed to produce a compressed ethylene (417) in an ethylene recompression system (48).

Compression and Cooling

Figure 5:
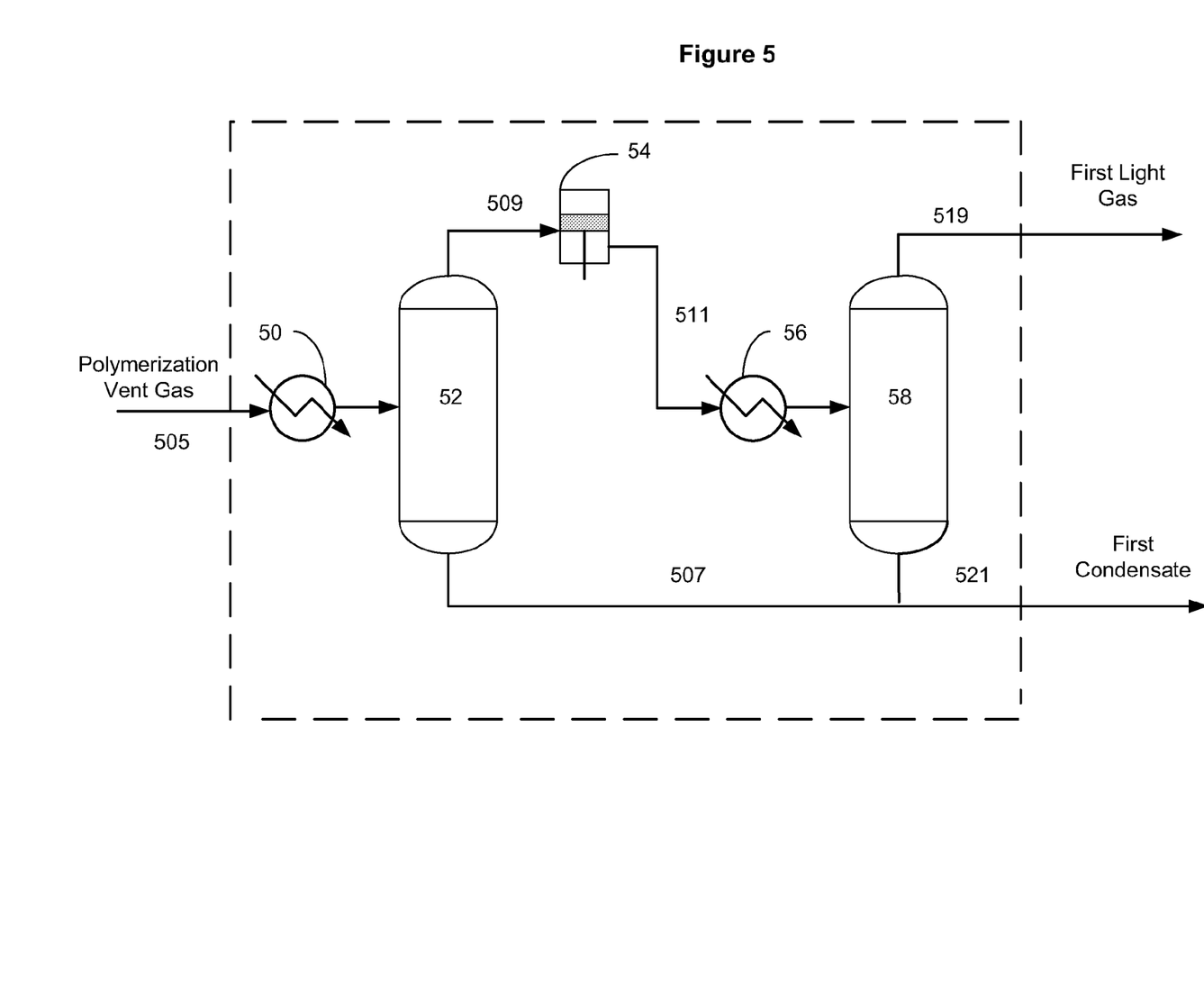
FIG. 5 illustrates a process for recovering hydrocarbons from a polymerization vent gas using compression and cooling of a polymerization vent gas.

One example of the second vent gas recovery system (49) in FIG. 4 is illustrated in FIG. 5. FIG. 5 illustrates a method for compressing, cooling, and separating a polymerization vent gas (505) to produce a second light gas (519) and a second condensate (521).

The polymerization vent gas (505) may be cooled in a pre-cooler (50) to condense any liquids. Any condensed suction liquids (507) may be separated from a suction gas (509) in a suction drum (52) prior to feeding the suction gas (509) to a vent gas compressor (54). The compressed vent gas (511) may be cooled in an after-cooler (56) to condense any discharge liquids. The discharge liquids may be separated into a second condensate (521) and a second light gas (519) in a discharge drum (58). The suction liquids (507) and the discharge liquids (521) may be combined, and a joint stream may be sent to polymerization. The second light gas (519) may be sent to a first vent gas recovery system.

Mechanical Refrigeration

In some embodiments, mechanical refrigeration may be used to cool the polymerization vent gas in order to condense and remove a higher fraction of hydrocarbon in the polymerization vent gas than may be achieved using compression alone. Mechanical refrigeration may occur upstream of the ethylene refrigeration by ethylene expansion and recompression.

Mechanical refrigeration may use a compression refrigeration system to provide a coolant, such as chilled brine or glycol mix, to the vent recovery area. Mechanical refrigeration units (MRU) may achieve a final polymerization vent gas condensation temperature of as low as approximately −10 to −20° C., and thus may facilitate a higher hydrocarbon recovery than that achieved with a non-refrigerated cooling medium, such as water or air.

Advantages of Ethylene Refrigeration

While mechanical refrigeration at a final condensation temperature of as low as −20° C. (−4° F.) may improve hydrocarbon recovery from the polymerization vent gas, there is a need in the art for further improvement.

A study has shown that in current market of rising energy prices, it may be economically feasible to cool the polymerization process vent gas at even lower temperatures of approximately −40 to −60° C. (−40 to −76° F.), in order to further increase the recovery of liquid hydrocarbons via condensation.

MRU's can potentially deliver the refrigerant for vent gas recovery at such cold temperatures; however this may be cost-prohibitive for many operators. For example, an expensive type of compressor may be required, and the power consumption costs necessary to achieve the incremental cooling from about −10° C. (14° F.) down to −40 to −60° C. may increase by a factor of approximately 2-3. Mechanical refrigeration may also require handling of special heat transfer fluids as the compression gas, such as halo-fluorocarbons, and as the refrigeration medium, such as brine or glycol. Introduction of the new chemicals may require extensive investment in handling facilities and infrastructure. In addition, some of the specialized heat transfer fluids required for mechanical refrigeration, such as halo-fluorocarbons, may be dangerous and toxic.

One advantage of using ethylene expansion and recompression to provide refrigeration for the polymerization vent gas recovery according to embodiments disclosed herein is the increased recovery of hydrocarbon, such as ethylene monomer, that may be re-used in the polymerization process, and may thus decrease the ethylene feedstock costs.

Another advantage of using ethylene expansion and recompression to provide refrigeration for the polymerization vent gas recovery is the reduction in environmental flare emissions resulting from combusting the unrecovered residual hydrocarbon in the polymerization vent gas. In addition to reduced flaring of the hydrocarbon contained in the vent gas, less assist gas, such as natural gas, may be required to facilitate smoke-free combustion of the olefin monomer at the flare.

Yet another advantage of using ethylene expansion and recompression to provide refrigeration for the polymerization vent gas recovery is the ability to re-use the residual light gas that is formed after heavier hydrocarbon removal from the polymerization vent gas. The residual light gas comprising inerts, such as nitrogen and argon, and other light gases such as hydrogen, ethylene, and ethane, may be recycled as a purge medium for a polymer purge bin, thereby reducing the usage of the primary purge medium, such as utility nitrogen, and also reducing the environmental flaring.

Another advantage of using ethylene expansion and recompression to provide refrigeration for the polymerization vent gas recovery is that high pressure ethylene source is already available on site and may thus require a much smaller capital investment compared to mechanical refrigeration. Further, no refrigerant condenser may be required, and the heat of compression may reduce the steam load on any high-pressure ethylene heater upstream of the ethylene purification system.

Another advantage of using ethylene refrigeration is that fewer chemicals, such as heat transfer fluids, may be used at the site to facilitate refrigeration of the polymerization vent gas. In some embodiments, the need for additional chemicals associated with the polymerization vent gas refrigeration may be completely eliminated.

Yet another advantage of using ethylene refrigeration for the polymerization vent gas recovery is improved refrigeration heat transfer efficiency. For example, increased heat transfer efficiency may be achieved, because the ethylene refrigerant and the polymerization vent gas may have a similar composition, and therefore similar heat transfer properties. As a result, a lesser refrigerant volume may be required to recover the same amount of hydrocarbon from the polymerization vent gas, thus reducing the size and cost of processing equipment and piping and reducing the ethylene compression costs.

The ethylene refrigerant volume, and consequently the equipment and piping size and the ethylene compression costs, may be further reduced by combining ethylene refrigeration with compression and cooling of the polymerization vent gas. For example, as illustrated in FIG. 4, the polymerization vent gas may initially be compressed and cooled using non-cryogenic or mechanical refrigeration in one step and then further cooled using ethylene refrigeration in another step. First, the initial compression may reduce the volumetric flow of the polymerization vent gas, thus also reducing the piping and process equipment costs. Second, condensation and recovery of hydrocarbon using non-cryogenic or mechanical cooling may further reduce the volumetric flow of the polymerization vent gas and the incremental amount of hydrocarbon to be recovered in the downstream ethylene refrigeration recovery system.

Another advantage of using ethylene expansion and recompression refrigeration in series with an existing polymerization vent gas compression and cooling system is the potential to reduce the capital equipment cost by combining the new ethylene compression with the existing vent recovery compression. For example, one or more ethylene recompression cylinders may be added to the existing vent recovery compressor, thus avoiding additional motor and foundation costs, among others.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A process for recovery of hydrocarbons from a polymerization vent gas, the process comprising:
   (a) reducing a pressure of an ethylene stream from a pressure of greater than or equal to 3.4 MPa to a pressure of less than or equal to about 1.4 MPa to form a reduced pressure ethylene stream;
   (b) cooling a vent gas comprising a monomer via heat exchange with the reduced pressure ethylene stream to form a first condensate comprising at least a portion of the monomer entrained in a first light gas;
   (c) recovering the first condensate and the first light gas;
   (d) separating the first condensate from the first light gas;
   (e) compressing the reduced pressure ethylene stream to a pressure of greater than or equal to 2.4 MPa;
   (f) passing the compressed ethylene stream to a polymerization reactor.

2. The process according to claim 1, wherein the pressure of the ethylene stream is reduced to 0.9 MPa or less.

3. The process according to claim 1, wherein the pressure of the ethylene stream is reduced to 0.2 MPa or less.

4. The process according to claim 1, further comprising cooling the ethylene stream to a temperature of 10° C. or less before step (a).

5. The process according to claim 1, further comprising cooling the compressed ethylene stream a temperature of 10° C. or less.

6. The process according to claim 1, further comprising cooling the polymerization vent gas via heat exchange with the reduced pressure ethylene stream resulting from step (b) and/or the first light gas from step (d).

7. The process according to claim 1, further comprising passing at least a portion of the first light gas to a polymer purge bin.

8. The process according to claim 1, further comprising:
   compressing a polymerization vent gas;
   cooling the compressed polymerization vent gas to form a second condensate entrained in a second light gas;
   recovering a two phase mixture containing the second light gas and the second condensate;

separating the second light gas and the second condensate;
feeding the second light gas as the vent gas for the cooling a vent gas;
recovering the second condensate;
combining the first and second condensates; and
feeding the combined condensate to a polymerization reactor.

9. A system for used with the process of claim 1, the system comprising:
   an ethylene expander;
   a first vent gas recovery system in fluid communication with the ethylene expander comprising:
      a heat exchanger in fluid communication with a vent gas line and the ethylene expander and configured to provide heat exchange between an incoming vent gas and ethylene from the ethylene expander, whereby incoming ethylene from the ethylene expander is condensed into a first condensate comprising ethylene monomers in a first light gas;
      a separator in fluid communication with the heat exchanger having an inlet configured to receive the first condensate, and configured to separate the first condensate from the first light gas; and
      a compressor in fluid communication with the separator having an inlet configured to receive the first light gas from the separator, wherein the first vent gas recovery system further comprises one or more heat exchangers configured to cool a polymerization vent gas via heat exchange with the reduced pressure ethylene and/or the first light gas.

10. The system according to claim 9, further comprising a cooler in fluid communication with the compressor and configured to cool compressed ethylene to a temperature of 10° C. or less.

11. The system according to claim 9, wherein the ethylene expander comprises an expander turbine and a pre-compressor, wherein the expander turbine is connected by a driving shaft to the pre-compressor to provide additional compression of the reduced pressure ethylene.

12. The system according to claim 9, wherein the compressor is a reciprocating compressor.

* * * * *